United States Patent
Reggio et al.

(10) Patent No.: US 9,116,517 B2
(45) Date of Patent: Aug. 25, 2015

(54) METHOD, SYSTEM AND COMPUTER PRODUCT FOR CONTROLLING A MANUFACTURING PROCESS

(71) Applicant: SIEMENS AKTIENGESELLSCHAFT, Munich (DE)

(72) Inventors: Elena Reggio, Genoa (IT); Alessandro Raviola, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 345 days.

(21) Appl. No.: 13/795,281

(22) Filed: Mar. 12, 2013

(65) Prior Publication Data

US 2013/0245805 A1    Sep. 19, 2013

(30) Foreign Application Priority Data

Mar. 13, 2012    (EP) .................................... 12159245

(51) Int. Cl.
*G05B 19/18*    (2006.01)
*G06Q 10/06*    (2012.01)
*G06Q 50/04*    (2012.01)

(52) U.S. Cl.
CPC ................ *G05B 19/18* (2013.01); *G06Q 10/06* (2013.01); *G06Q 50/04* (2013.01)

(58) Field of Classification Search
CPC ......... G05B 19/18; G06Q 10/06; G06Q 50/04
USPC ................................ 700/95, 97, 99, 100, 103
See application file for complete search history.

(56) References Cited

U.S. PATENT DOCUMENTS

| | | | |
|---|---|---|---|
| 6,684,121 B1 * | 1/2004 | Lu et al. | 700/108 |
| 7,603,195 B2 * | 10/2009 | Puri et al. | 700/112 |
| 7,848,836 B2 * | 12/2010 | Gozzi et al. | 700/100 |
| 7,962,233 B2 * | 6/2011 | Tiozzo | 700/100 |
| 8,032,243 B2 * | 10/2011 | Raviola et al. | 700/103 |
| 8,121,716 B2 * | 2/2012 | Offenmuller | 700/97 |
| 8,126,573 B2 * | 2/2012 | Bouriant | 700/1 |
| 8,532,805 B2 * | 9/2013 | Mazzarone et al. | 700/96 |
| 2005/0022171 A1 * | 1/2005 | Langkafel et al. | 717/136 |
| 2005/0039161 A1 * | 2/2005 | Pfander et al. | 717/105 |

(Continued)

FOREIGN PATENT DOCUMENTS

EP    2 365 410 A1    9/2011

*Primary Examiner* — Charles Kasenge
(74) *Attorney, Agent, or Firm* — Laurence A. Greenberg; Werner H. Stemer; Ralph E. Locher

(57) ABSTRACT

A method and a system control a manufacturing process. The method includes providing an MES system with a product definition model having at least one product-related entity. Define for one product-related entity a set of product-related entities referencing the one product-related entity and each other via a nested structure. Define for each product-related entity a set of product-related parameters to define the information that may be sent to the MES system. Within the product definition model, define an additional entity called parameter exchange definition for providing a tool for defining how data of product-related parameters of nested product-related entities and of the parent product related entity are to be exchanged among each other. At engineering time, build the given product definition of the given final material by inserting the entities. At run time, instantiating the entities into run-time production requests objects obtained by the given product definition.

9 Claims, 2 Drawing Sheets

(56) References Cited

U.S. PATENT DOCUMENTS

| | | | |
|---|---|---|---|
| 2005/0044532 A1* | 2/2005 | Pfander et al. | 717/124 |
| 2005/0108265 A1* | 5/2005 | Langkafel et al. | 707/101 |
| 2005/0125089 A1* | 6/2005 | Puri et al. | 700/96 |
| 2005/0159932 A1* | 7/2005 | Thurner | 703/2 |
| 2005/0160412 A1* | 7/2005 | Thurner | 717/148 |
| 2006/0206368 A1* | 9/2006 | Bamberger et al. | 705/7 |
| 2007/0061034 A1* | 3/2007 | Puri et al. | 700/112 |
| 2008/0091289 A1* | 4/2008 | Gozzi et al. | 700/100 |
| 2008/0294279 A1* | 11/2008 | Tiozzo | 700/100 |
| 2009/0019368 A1* | 1/2009 | Corsini | 715/733 |
| 2009/0076785 A1* | 3/2009 | Raviola et al. | 703/6 |
| 2010/0057236 A1* | 3/2010 | Reggio et al. | 700/100 |
| 2010/0070062 A1* | 3/2010 | Fontanot | 700/100 |
| 2010/0305736 A1* | 12/2010 | Arduini | 700/100 |
| 2011/0060440 A1* | 3/2011 | Copello et al. | 700/99 |
| 2011/0130856 A1* | 6/2011 | Fontanot | 700/100 |
| 2011/0224814 A1 | 9/2011 | Mazzarone et al. | |

* cited by examiner

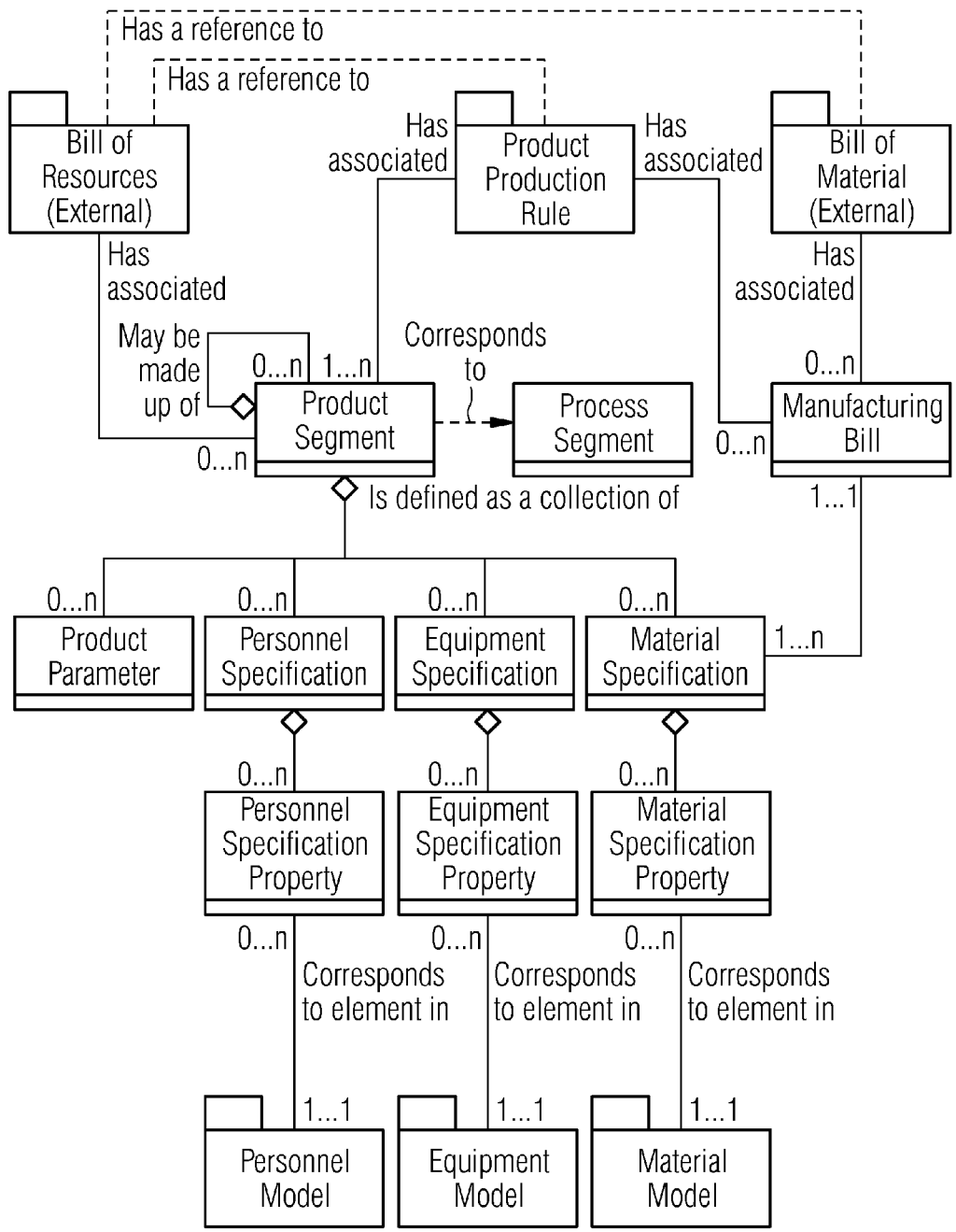

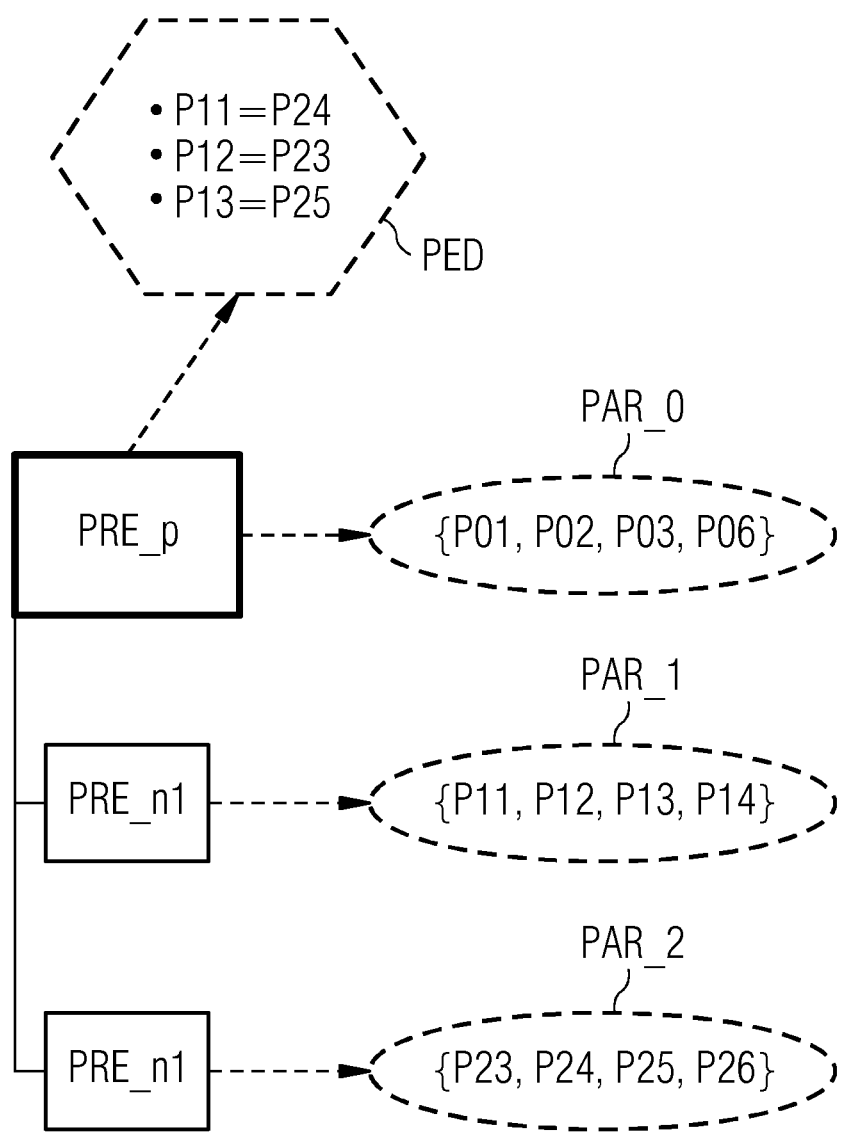

METHOD, SYSTEM AND COMPUTER PRODUCT FOR CONTROLLING A MANUFACTURING PROCESS

CROSS-REFERENCE TO RELATED APPLICATION

This application claims the priority, under 35 U.S.C. §119 (e), of European application No. EP 12 159 245.5 filed Mar. 13, 2012; the prior application is herewith incorporated by reference in its entirety.

BACKGROUND OF THE INVENTION

Field of the Invention

The invention relates to a method and a system for controlling a manufacturing process, especially in a production facility employing a computer managed manufacturing execution system (MES).

As defined by the Manufacturing Enterprise Solutions Association (MESA International), a MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication."

The functions that MES systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking.

For example, Siemens Corporation offers a broad range of MES products, under its SIMATIC® product family.

Typically, at engineering time, MES client applications are used by system engineers for customizations according to the specific manufacturing plant requirements. Instead, at runtime, MES client applications are utilized by end-users such as plant operators or line responsible personnel.

An accurate modeling of the manufacturing process is essential for both scheduling and execution and to eventually achieve a good level of operational performance in manufacturing activities.

A well known example of a model for manufacturing is found in a standard called ISA-595. The standard ISA S95 is an extension by a batch mode of the ISA S88 standard for process control engineering in manufacturing, applicable for discrete and continual production types. It defines schemes for the individual production steps, the schemes containing rules about information exchange between different production phases required in the manufacturing execution system.

The ISA-S95 standard is the common basis used for the development of MES systems. It consists of several parts each of them with a specific scope. In particular, Part 2 of the ISA-S95 standard [A] deals with the object model representing the entities involved in a manufacturing process, by defining models for production capabilities, process segment capabilities, personnel, equipment, materials, process segments, product definition information, production schedules and production performances. Such entities represent the resources to be used during the execution of a production request or order.

As explained in Part 1 of the ISA-S95 standard [B], MES systems drive the execution of production requests and the engineering of product production rules used to generate production requests.

Here below are reported the definitions for "production request", for "production rule" (also known as "product production rule, PPR") and for "product segment" (or also known as "production phase") as written in Part 1 of the ISA-S95 standard [B]:

a) "A production request defines a request for production for a single product identified by a production rule. A production request contains the information required by manufacturing to fulfill scheduled production. A production request might identify or reference the associated production rule."

b) "Production rules—The information used to instruct a manufacturing operation how to produce a product."

c) "Product segments—The shared information between a plan-of-resources and a production-rule for a specific product. It is a logical grouping of personnel resources, equipment resources, and material specifications required to carry out the production step."

A product production rule with its associated product segments is shown in FIG. 1. FIG. 1 is a block diagram illustrating the product definition model as taken from FIG. 21 of Part 1 of the ISA-S95 standard [B]. As used herein, with the term product-related entity it is meant either a product production rule entity or a product segment entity.

The structure of production requests and product production rules is often complicated since it may require several nesting levels, i.e. the organization of information in layers or objects containing similar objects.

Taking a simple example from the pharmaceutical manufacturing field, the production request to produce a certain quantity of a given medication may require that the final material is composed by two intermediate materials mixed together, e.g. the excipient ingredient and the active ingredient.

In the manufacturing field, it may be required that some intermediate materials are used more than once in the same final material or that the same intermediate materials are used in different final materials.

In such situations, it is desirable that the process/system engineer be able to model the productive process by specifying inside at the productive process the same sub-process several times or by specifying a sub-process as a copy of an already defined process.

Unfortunately, up to date, the S95 standard is silent about the concept of sub-process or sub product definition, since the S95 standard is disclosing only the concept of product definition.

Thus, the process/system engineer is required to replicate the contents of the so-called sub-product definition, as many times as needed by the productive processes since he/she has no tool to define once a sub product definition and then reference it by other product definitions.

Of course, having the explosion of the content of a sub product definition in a MES system introduce inefficiency and represent a weakness due to the fact that a user should replicate the same sub product definition several times with consequences on usability of the system, poor performance and high cost of maintenance; e.g. when the process engineer needs to make a change in a sub product exploded several times in the system.

As it can be seen in FIG. 1 defined in the S95 standard, the production of each intermediate material of the above mentioned medication production example can be modeled via a product segment since a structure of nested product segments is foreseen by the S95 standard.

However, it may also be desirable that the production of each intermediate material be modeled via a product production rule which is of a higher complexity level and would avoid the cumbersome replication of several product segments during the modeling process. For example, the process engineer may wish to model the first intermediate material with a first product production rule to produce the excipient and the second intermediate material with a second product production rule to produce the active ingredient. Then, he/she may wish to have a main "parent" product production rule with an assembly step for encapsulating the medication mixture into tablets.

Beside the above mentioned need of having nested product production rules mirroring sub-production processes, there is an issue regarding the need for information exchange among nested product production rules and/or product segments.

In fact, it may be the case that the quantity of the active ingredient is strictly related to the quantity of the excipient ingredient and their percentages need to be properly balanced into the mixture in order to reach the same desired medication concentration in every tablet. Theoretically, a given product production rule or product segment to produce the excipient ingredient should generate a precise given quantity of intermediate material but, since, some losses or imprecisions may always be present, it might be proven necessary that the quantity of active ingredient be aligned in order to obtain the desired mix ratio. In some other scenarios, it might be required that some output information of the excipient intermediate material is used as input of the second product production rule (e.g. temperature, weight, humidity etc.).

In general, such requirements may arise when a production segment (i.e. a production phase) or an intermediate product production rule depends on others steps (e.g. intermediate material or production phase or workflow) and this may occur, not only for precision reasons, but also when the result of specific phase/intermediate production rule can influence the ones which follow.

In state of the art MES systems, custom logics are used to get product production rules or product segments to communicate among each other.

This means that, on a project basis, the environment provided by a MES system is enriched with logics performing query and saving data on a database for sharing process and sub-process information between nested product production rules and/or production phases.

Such operations are usually performed on a project basis since even the ISA-S95 Standard does not foresee concepts such as the nesting of product production rules and such as the exchange of input/output information among nested product production rules and/or production phases.

Thus, known techniques used so far suffer from the below drawbacks:
1. They require high maintenance costs;
2. They are error prone; and
3. The efforts of process/system engineering in order to implement customer requirements on a project basis do require in depth software skills.

SUMMARY OF THE INVENTION

It is accordingly an object of the invention to provide a method, a system and a computer product for controlling a manufacturing process which overcome the above-mentioned disadvantages of the prior art methods and devices of this general type, which enables the sharing of process parameters among nested product related-entities without requiring the use of custom logics.

The aforementioned aim is achieved by a method and a system for controlling a manufacturing process of a plant via a MES system. The method includes the steps of:
a) providing the MES system with a product definition model containing MES entities of different types for defining an exchange of information among the different MES entities; wherein such MES entities contain at least one product-related entity;
b) providing to the MES entities, associating methods for working with a given product definition of a given final material modeled according to the product definition model;
c) within the product definition model, defining for one product-related entity a set of product-related entities referencing the one product-related entity and each other via a nested structure, wherein the one product-related entity is hereinafter referred as the parent product-related entity and the set of product-related entities is hereinafter referred as the set of nested product-related entities;
d) within the product definition model, defining for each product-related entity a set of product-related parameters to define the information that may be sent to the MES system to control the plant manufacturing process of the given final material; within the product definition model, defining an additional entity called parameter exchange definition for providing a tool for defining how data of product-related parameters of nested product-related entities and of the parent product related entity are to be exchanged among each other at run-time by the MES system;
e) at engineering time, building the given product definition of the given final material also by inserting the entities of items c), d) and by specifying how the product-related parameters are exchanged;
f) at run time, instantiating the entities of item e) into run-time production requests objects obtained by the given product definition; and
g) at run time, controlling the plant manufacturing process by executing the production requests of item f).

In an inventive embodiment, the parameter exchange definition entity may preferably contain the definition of the direction of the data to be exchanged, whether product-related parameters are input data or output data.

In another inventive embodiment, the product-related entities may be product production rule entities or product segment entities.

In a further inventive embodiment, the product-related entities may conveniently be a combination of product production rule entities and of product segment entities.

In an added inventive embodiment, the parameter exchange definition entity may advantageously contain a set of APIs.

In yet another inventive embodiment, the product definition model may be preferably taken from the ISA-S95 standard.

Furthermore, a computer program element can be provided, containing non-transitory computer program code for performing steps according to the above mentioned method when loaded in a digital processor of a computing device.

Additionally, a computer program product stored on a computer usable medium can be provided, containing non-transitory computer readable program code for causing a computing device to perform the mentioned method.

Embodiments of the invention provide the process engineer with the tools to define at engineering time the information exchange between nested product production rules. In fact, the process engineer has only to specify how data of product-related parameters are exchanged without requiring the direct access to data in order to perform the transfer of information.

Embodiments of the invention enable product production rules and/or product segment to communicate among each other.

Embodiments of the invention provide an independency from the Data Layer provided by the database as they do not rely on custom logics.

Embodiments of the invention enable re-usability of production rules during the modeling phase.

Embodiments of the invention reduce the customization efforts during the engineering phase.

Other features which are considered as characteristic for the invention are set forth in the appended claims.

Although the invention is illustrated and described herein as embodied in a method, a system and a computer product for controlling a manufacturing process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a block diagram illustrating a product definition model taken from the ISA-S95 standard according to the prior art; and FIG. 2 is a block diagram schematically illustrating an example of information data exchange among MES product-related entities according to an example embodiment of the present invention.

DETAILED DESCRIPTION OF THE INVENTION

According to the present invention, a manufacturing process of a plant is controlled via a MES system. The MES system is provided with a product definition model similar as the one shown in FIG. 1. In the product definition model there are MES entities of different types with at least one product-related entity, i.e. a product production rule or a product segment.

To the MES entities, are associated methods, e.g. API interfaces, for working with a given product definition of a given final material modeled according to the product definition model.

Within the product definition model, it is defined a nesting structure in which a set of zero or more nested product-related entities are referencing each other and/or a parent product-related entity. Thus, a Product Production Rule can have from 0 to N nested Product Production Rule for producing intermediate materials or parts.

For the previously mentioned simple case example, two intermediate product production rules for excipient and active ingredients are referencing the parent product production rule for a given medication final material.

Within the product definition model, it is defined for each product-related entity a set of zero or more product-related parameters to define the information that may be sent to the MES system to control the plant manufacturing process of the given final material. For example, such information may preferably contain the names and types of the values to be sent to the MES control system to parameterize or drive the manufacturing of the final material. For the previously mentioned simple case example, the product-related parameters may comprise the weight, the temperature and the humidity of the excipient and active ingredients.

Within the product definition model, defining an additional entity called parameter exchange definition which is providing a tool for defining how data of product-related parameters of nested product-related entities and of the parent product related entity are to be exchanged among each other at runtime by the MES system. The direction of the data to be exchanged may advantageously be defined, e.g. whether product-related parameters are input or output data. The parameter exchange definition entity may preferably comprise a set of APIs so that the MES system provides a set of API for defining which information is to be exchanged between product related entities.

For example the Parameter Exchange Definition may be modeled in an XML schema like the following simplified XSD schema shown in Table 1 below including the main information, i.e. the name of the two different product-related parameters exchanging data and the direction of the exchange.

TABLE 1

```
<?xml version="1.0" encoding="UTF-8"?>
<xs:schema xmlns:xs="http://www.w3.org/2001/XMLSchema">
<xs:complexType name="ParameterExchangeDefinition">
<xs:element name="ReferencingParameterName" type="xs:string"/>
        <xs:element name="ReferencedParameterName"
type="xs:string" />
        <xs:element name="Direction">
            <xs:simpleType>
                <xs:restriction base="xs:string">
                    <xs:enumeration value="INPUT"/>
                    <xs:enumeration value="OUTPUT"/>
                    <xs:enumeration
value="INPUTOUTPUT"/>
                </xs:restriction>
            </xs:simpleType>
        </xs:element>
    </xs:complexType>
</xs:schema>
```

In another example, the Parameter Exchange Definition may be modeled by using classic programming languages, like C#, and defining a C# Class modeling Parameter Exchange Definition as shown in Table 2 below with a C# set of API for managing the Parameter Exchange Definition.

TABLE 2

```
public class ParameterExchangeDefinition
{       ...
        private string __ReferencingParameterName;
        private string __ReferencedParameterName;
        private string __Direction;
        ...
        public string ReferencingParameterName
        {
            get
            { return this.__ReferencingParameterName; }
            set
            { this.__ReferencingParameterName = value; }
        }
        public string ReferencedParameterName
        {
            get
            { return this.__ReferencedParameterName; }
            set
```

TABLE 2-continued

```
        { this.__ReferencedParameterName = value; }
    }
    public string Direction
    {
        get
        { return this.__Direction; }
        set
        { this.__Direction = value; }
    }
    public MyReturnValueType AddInstance( )
    {
        ...
    }
    ...
}
```

During the engineering phase, the system/process/product engineer builds the given product definition of the given desired final material to be manufactured using the product definition model. At this stage, he/she inserts among the necessary MES entities of the product definition model, e.g. personnel, equipment, material specifications also the entities previously defined, i.e. the product-related entities, the associated product-related parameters and the parameter exchange definition entity. During this specification at engineering time, it can also be assigned the parameter values and the direction of parameter exchange.

At run time, instantiating the entities, specified at engineering time, into run-time production requests objects obtained by the given product definition for manufacturing the desired final material. In turn, the plant manufacturing process is controlled by executing such instantiated production requests.

Hence, once the production/process engineer has specified at engineering time which are the data to be exchanged, than the MES system itself will manage the mechanism of data exchange between the product-related entities used to create production requests by transferring the input/output information from a product production rule and/or a product segment to another one.

With embodiments of the present solution, the ISA-S95 standard can be extended by enabling product production rules referencing others product production rules, by enabling product production rules having their direct set of product parameters and by introducing the concept of Parameter Exchange Definition at product production rule and product segment level.

FIG. 2 is a block diagram schematically illustrating an example of information data exchange among product-related entities according to an example embodiment of the present invention.

As shown in FIG. 2, the product-related entity PRE_p is a parent entity referencing two nested product-related entities PRE_n1, PRE_n2. The parent entity PRE_p has its own set of product-related parameters PAR_0 {P01, P02, P03, P04}. The first nested product-related entity PRE_n1 has its own set of product-related parameters PAR_1 {P11, P12, P13, P14} and the second nested product-related entity PRE_n2 has its own set of product-related parameters PAR_2 {P23, P24, P25, P26}.

As shown in FIG. 2, the process/system engineer has defined at the level of the parent product related entity PRE_p the flow of information exchange among product-related-entities by specifying that some product-related parameters are in communication with each other by exchanging their data. For example, it is specified that the value of product-related parameter P11 is provided by the value of product-related parameter P24, via a parameter exchange definition entity PED which states how the product related parameters of the first entity PRE_n1 are exchanged with the product parameters of the second entity PRE_n2, i.e. P11=P24; P12=23; P13=P25.

The product-related entities PRE_p, PRE_n1, PRE_n2 may represent in this example product production rules or product segments. For example, by considering the above mentioned simple case example, the parent product-related entity PRE_p may represent the product production rule producing the final material by encapsulating the medication mixture of the two intermediate materials. The two intermediate materials are in turn produced by two product production rules PRE_n1, PRE_n2 for the production of the excipient ingredient and the active ingredient respectively. The set of product-related parameters PAR_0, PAR_1, PAR_2 may comprise parameters such as the temperature, the humidity and the weight of the excipient and active ingredients which may depend on each other in accordance of the desired mix ratio of the medication formula.

This simple example shows how, in some cases, it is important that Product Production Rules of the intermediate materials be able of communicating one to the other and that Product Production Rules be able of accepting input information and of providing output information. This kind of requirement is usually present because not only Product Production Rules should communicate but even Production Phases should communicate the result of their job to other Production Phases.

In addition to the embodiments of the present invention described above, the skilled person in the art will be able to arrive at a variety of other arrangements and steps which, if not explicitly described in this document, nevertheless fall within the scope of the appended claims.

For example, the nesting of product-related entities may have various different structures of different complexities also combining product production rules and product segments, mirroring manufacturing processes of materials and components in a large variety of manufacturing fields.

LIST OF CITED ACRONYMS

API Application Program Interface
MES Manufacturing Execution System
XML eXtensible Markup Language
XSD XML Schema Document

LIST OF CITED STANDARDS

[A] Part 2 of the ISA-S95 standard:
ISA-Draft S95.00.02
Enterprise-Control System Integration
Part 2: Object model attributes
Draft 5, August 2000
[B] Part 1 of the ISA-S95 standard:
ISA-Draft S95.00.01-2000
Enterprise-Control System Integration
Part 1: Models and Terminology
Draft 15, January 2000

The invention claimed is:

1. A method for controlling a manufacturing process of a plant via a MES system, which comprises the steps of:
    a) providing the MES system with a product definition model containing MES entities of different types for defining an exchange of information among the MES entities, wherein the MES entities contain at least one product-related entity;

b) providing to the MES entities, associating methods for working with a given product definition of a given final material modeled according to the product definition model;

c) within the product definition model, defining for the product-related entity a set of product-related entities referencing the product-related entity and each other via a nested structure, the product-related entity is hereinafter referred as a parent product-related entity and the set of product-related entities is hereinafter referred as a set of nested product-related entities;

d) within the product definition model, defining for the product-related entity a set of product-related parameters to define information that may be sent to the MES system to control a plant manufacturing process of the given final material;

e) within the product definition model, defining an additional entity called parameter exchange definition for providing a tool for defining how data of product-related parameters of the set of nested product-related entities and of the parent product related entity are to be exchanged among each other at run-time by the MES system;

f) at engineering time, building a given product definition of the given final material by inserting the entities of steps c), d), e) and by specifying how the set of product-related parameters are exchanged;

g) at run time, instantiating the entities of step f) into run-time production requests objects obtained by the given product definition; and h) at run time, controlling the plant manufacturing process by executing the production requests of step g).

2. The method according to claim 1, wherein the parameter exchange definition entity contains a definition of a direction of the data to be exchanged, whether product-related parameters are input data or output data.

3. The method according to claim 1, which further comprises forming the product-related entities as product production rule entities.

4. The method according to claim 1, which further comprises forming the product-related entities as product segment entities.

5. The method according to claim 1, wherein the product-related entities are a combination of product production rule entities and of product segment entities.

6. The method according to claim 1, wherein the parameter exchange definition entity comprises a set of application program interfaces.

7. The method according to claim 1, wherein the product definition model is taken from a ISA-S95 standard.

8. A system, comprising:
a processor programmed for performing the steps of the method according to claim 1.

9. A non-transitory computer-readable medium having non-transitory computer executable instructions to executed on a processor, the non-transitory computer executable instructions performing the method according to claim 1.

\* \* \* \* \*